United States Patent [19]

Duck et al.

[11] 4,378,144
[45] Mar. 29, 1983

[54] OPTICAL SWITCH

[75] Inventors: Gary S. Duck, Nepean; Masamichi Yataki; Jozef Straus, both of Ottawa; William J. Sinclair, Kanata, all of Canada

[73] Assignee: Northern Telecom Limited, Montreal, Canada

[21] Appl. No.: 218,482

[22] Filed: Dec. 22, 1980

[51] Int. Cl.³ .............................................. G02B 7/26
[52] U.S. Cl. .................................. 350/96.18; 350/96.2
[58] Field of Search ........................... 350/96.18, 96.20

[56] References Cited

U.S. PATENT DOCUMENTS 4,088,387  5/1978  Lewis ............................ 350/96.20 X
4,193,662  3/1980  Hara ............................. 350/96.20 X

FOREIGN PATENT DOCUMENTS 84903  6/1980  Japan .................................. 350/96.20

Primary Examiner—Paul L. Gensler
Attorney, Agent, or Firm—R. J. Austin

[57] ABSTRACT

An optical switch having a light input side and a light output side where there are a plurality of optical waveguides with light collimating lenses on one of the sides with the lenses in spaced positions and, on the other side there is an optical waveguide with a light collimating lens. To enable light to be transferred between the latter waveguide and any of the other lenses, it is movable to bring its lens into any of a plurality of switch positions, each corresponding to the position of one of the other lenses, and means is provided to move the lens selectively between positions. In preferred arrangements, the plurality of lenses are arranged around at least one pitch circle but a linear arrangement of lenses is also possible. An electric stepping motor is ideally used for the switching operation.

5 Claims, 9 Drawing Figures

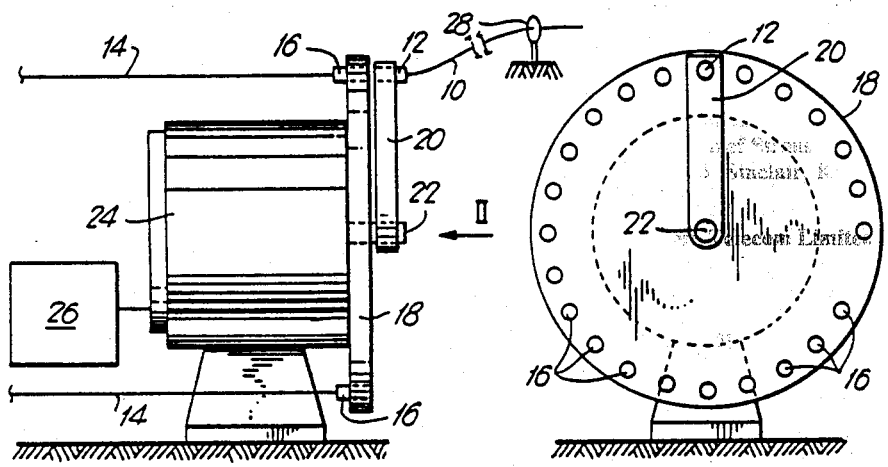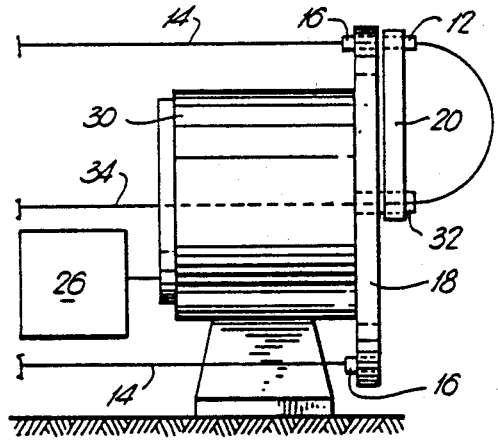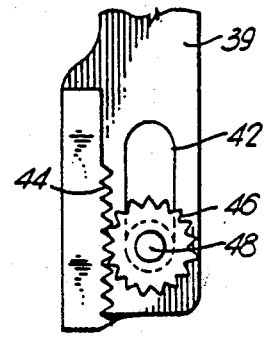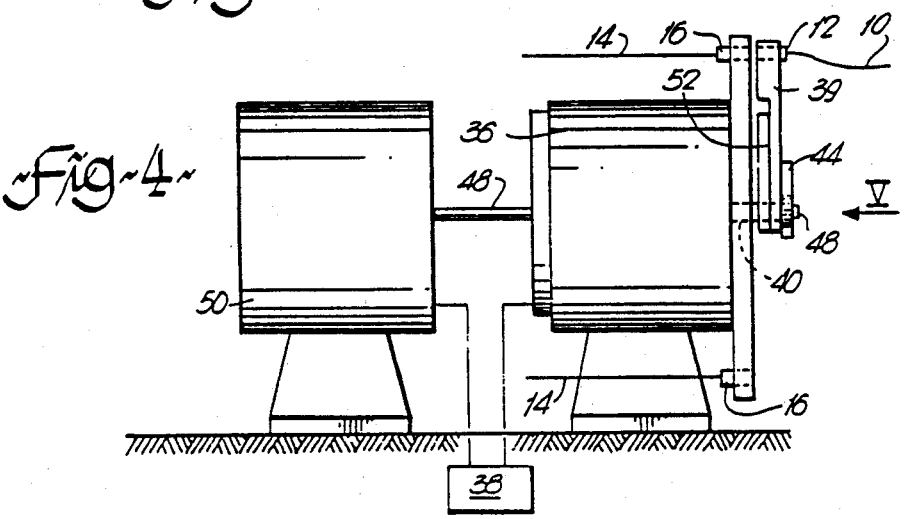

OPTICAL SWITCH

This invention relates to optical switches.

In some known constructions of optical switches, light is transmitted along an optical waveguide to a collimating lens and provides input to the switch. The light is transferred from the lens selectively to one of a number of light output waveguides by light transfer mirrors or prisms. To transfer the light to a different output waveguide, movement of the mirrors or prisms is accomplished to redirect the light from the input waveguide. The movement upon the prisms or mirrors is restrictive and it has been found that the light output waveguides cannot exceed two or three in number.

In another optical switch which has been described, a square sectioned bore in a tube receives in its corners, four output waveguides which pass from one end of the tube. An input waveguide extends into the other end of the tube and is locatable alternatively in any one of the corners of the bore to transfer light to any one of the four output waveguides. One disadvantage with this switch is that a maximum of four outputs is provided. Another disadvantage is that the switch needs to be made and operated within extremely fine limits to enable the input waveguide to be accurately aligned with each of the output waveguides for transference of light when it is realized that each waveguide has a core diameter of approximately 50 μmm.

The present invention provides an optical switch in which the number of waveguides may be far greater than is practicable with existing or known switches and also in which light is effectively and efficiently transferred.

According to the present invention, an optical switch is provided which has a light input side and a light output side, on one of its sides, the switch comprising a plurality of optical waveguides having collimating lenses, one lens at one end of each of said plurality of waveguides, the plurality of lenses being located in spaced-apart predetermined positions, and on the other of its sides the switch comprising an optical waveguide having a light collimating lens at one end, the lens being movable with its end of the waveguide into a plurality of switch positions in each of which light is transferable between it and any one of the plurality of lenses, the switch also comprising means for moving said movable lens and the end of its waveguide selectively from one switching position to another.

Preferably, the switch positions are disposed around at least one pitch circle the centre of which coincides with an axis of rotation of the movable lens, the lens being rotatable to change its switch positions. Alternatively, the lens movement is linear.

In the simplest and preferred arrangement, the movable lens is axially aligned with one of the plurality of lenses when in a switching position. However, light may be transferred by a light transfer device comprising at least one mirror or prism. In this case, the device is aligned permanently with the movable lens so as to be rotatable with it to transfer light to any one of the plurality of lenses upon reaching a switching position or a separate transfer device is fixed at each switching position.

Embodiments of the invention will now be described, by way of example, with reference to the accompanying drawings in which:

FIG. 1 is a side elevational view of an optical switch according to a first embodiment;

FIG. 2 is a view of the switch of FIG. 1 in the direction of arrow II in FIG. 1;

FIG. 3 is a side elevational view of an optical switch according to a modification of the first embodiment;

FIG. 4 is a side elevational view of an optical switch according to a second embodiment;

FIG. 5 is a view in the direction of arrow V in FIG. 4 of part of the switch of FIG. 4 and on larger scale;

FIG. 9 is an elevational view of a sixth embodiment.

Figure 6:
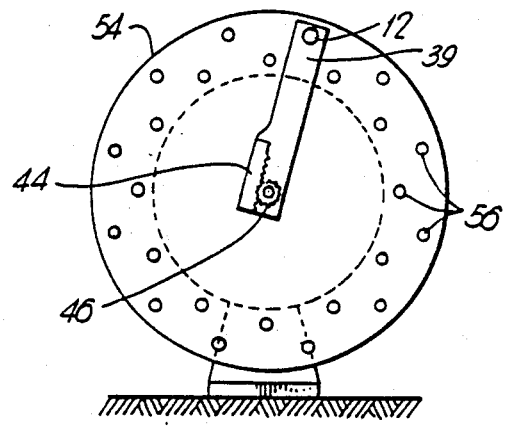
FIG. 6 is a view similar to FIG. 2 of a third embodiment.

In a first embodiment, as shown in FIGS. 1 and 2, an optical switch comprises a light input side in which it comprises a single optical waveguide 10, terminating at one end in a collimating lens 12. This lens and other lenses to be described in this and other embodiments is of a type sold under the trademark "Selfoc" ® and is a ¼ pitch collimating lens, although lenses of other pitches, e.g. ⅜ pitch, could be used. The lens provides a parallel sided light beam which in this case is about 1 mm in diameter, derived from a 50 mm core diameter of the waveguide. The lens is also anti-reflection coated at one end for low light loss.

On a light output side, the switch comprises a plurality of optical waveguides 14. The actual number is dependent upon requirements and in this embodiment ninety-nine waveguides are provided, (two only shown in FIG. 1 for clarity). Each waveguide is provided with a lens 16 at one end. These lenses form a group and are located in spaced-apart predetermined positions upon a pitch circle by securing the lenses through holes in a faceplate 18 as shown in FIG. 2.

The single lens 12 is fixed in a hole of an arm 20 which is secured to a rotatable shaft 22 passing through the faceplate with its rotational axis coincident with the pitch circle of the group of lenses 16.

The switch has ninety-nine switching positions, one for each lens 16. In each switching position, the lens 12 is axially aligned with a lens 16 so as to enable it to transfer light directly to the lens 16 as a collimated beam about 1 mm in diameter. The arm is thus rotatable to move the lens from one switching position to another around the arc of a circle of the same radius as the pitch circle of lenses 16. There is a small operating clearance between opposing ends of the lenses. Means is provided for rotating arm 20 and thus the lens selectively from one switch position to another, this means comprising an electric stepping motor 24 having at least ninety-nine stopping positions, one for each switching position. The shaft 22 is the driven shaft of the motor. The rotating means also comprises a control means, in the form of a microprocessor unit 26, connected to the motor 24. Upon the microprocessor unit being given a manual signal corresponding to a particular switching position, the unit allows just sufficient electrical pulses to pass to the motor to enable it to reach that position. Once in the chosen position, the lens 12 is axially aligned with the corresponding lens 16.

In use of the switch, the switching positions are easily selectively changed with the motor and unit 26. Although the group of lenses 16 and thus the switching positions on faceplate 18 appear on a closed pitch circle, the arm 20 is not rotatable for one complete revolution so as to avoid twisting of the waveguide 10 which is held at a position spaced from the arm in a stationary centering eye 28. Instead, there are two adjacent switching positions which provide limits of rotational movement. Rotation from one of the limit positions may take place only in one direction whereas, from the other, rotation may take place only in the other direction.

The above construction has a faceplate diameter of 4 inches while enabling the choice of ninety-nine switch positions. With the group of lenses disposed upon a single pitch circle, different amounts of lenses and thus of switching positions may be provided and the diameter of the faceplate will change accordingly. Hence, switches constructed in accordance with the general teachings of the first embodiment provide amounts of switching positions far in excess of those made possible by the prior constructions. Further, the number of switching positions in constructions according to the first embodiment are limited by the number of stopping positions to be obtained by available stepping motors.

Also in the use of the above embodiment and other embodiments to follow, the use of collimating lenses at input and output sides of the switch reduces to a minimum, the amount of light loss in transference to the output side of the switch. In addition, because of the relatively large diameter of the beam between the lenses and its non-diverging characteristic as compared to that provided between waveguide ends, a greater tolerance is acceptable in misalignment of the lenses than with waveguide ends while the light loss remains negligible. Thus, the degree of precision in manufacture of the switch is minimized.

In the manufacture of the switch of the first embodiment, to assure proper alignment of the lens 12 with each of lenses 16, the arm (devoid of lens 12) is attached to the shaft 22 of the motor after motor and faceplate have been secured together. Then the motor is rotated to each of its stopping positions and the hole for each lens 16 is drilled through the faceplate in alignment with the predrilled hole in the arm. Lenses 16 are then secured within the holes.

In further embodiments and modifications now to be described, like numerals relate to similar parts.

In a modification of the first embodiment as shown by FIG. 3, the motor 24 is replaced by a stepping motor 30 having a hollow driving shaft 32. In this construction, an input waveguide 34 to the collimator lens 12 extends through shaft 32 and is curved around to the lens 12. Thus in this construction, the waveguides all pass to the switch from the same side, i.e. to the rear of the faceplate and this results in a more compact arrangement.

In a second embodiment shown by FIGS. 4 and 5, a switch is provided which avoids the possibility of light passing from the input side to the output side as the movable lens scans across switching positions as it travels to a selected position.

In this construction, a stepping motor 36 and microprocessor unit 38 is provided, as before, for moving an arm 39 and lens 12. In this case, the shaft 40 of the motor is hollow. The arm 39 is received upon the shaft 40 by means of the shaft passing through a slot 42 of the arm. With the shaft at one end of the slot, as shown by FIG. 5, the lens 12 is axially aligned with a lens 16 at the switching position in which the lens 12 is set at any one time. Means is provided for moving the arm radially inwardly to locate lens 12 radially within the pitch circle of the lenses 16. This means comprises a rack and pinion 44 and 46, the rack being secured to the arm and the pinion mounted upon a driving shaft 48 of a second electric motor 50 mounted at the rear of stepping motor 36. The shaft 48 extends through the shaft 40 and the operation of motor 50 is controlled by the microprocessor unit 38.

In use, upon a manual operation of the unit 38 to move lens 12 from one switching position to another, a signal is sent by the unit to motor 50 which then moves the arm to locate the lens 12 radially inwardly. At termination of this movement, the stepping motor is activated to rotate the arm the required angular movement to locate the lens 12 radially inwardly of its selected switching position. The motor 50 is again activated to return the arm and lens 12 to the outer or switching position in which the lens 12 is in axial alignment with the appropriate lens 16. During the angular movement of the arm, as may be seen, the lens 12 does not align itself with any of the lenses 16. The arm 39 is held slidably in position upon a backing plate 52 which is secured to the shaft 40.

In a third embodiment as shown in FIG. 6, an optical switch comprises a faceplate 54 with a group of lenses 56 arranged around two concentric pitch circles. With this arrangement, for a faceplate of given diameter, more switching positions are provided. It is necessary, of course, to move the lens 12 radially so as to bring it from one pitch circle to the other dependent upon the switching position which has been chosen. For this, an arrangement using a second motor for causing the radial movement is provided and the construction shown in FIG. 4 of motors 36 and 50 and microprocessor unit 38 is suitable together with the rack and pinion device 44, 46 described in the second embodiment.

In use, the microprocessor unit is arranged to actuate the motor 50 to move the arm 39 radially only when change in switching position necessitates movement of the lens 12 between lenses 16 in different pitch circles.

Figure 7:
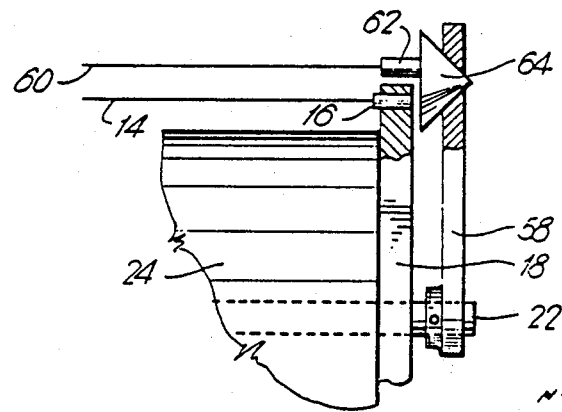
FIG. 7 is a side elevational view, partly in cross-section, of part of a fourth embodiment.

In a fourth embodiment shown in FIG. 7, an optical switch comprises on its input side, an arm 58 rotatable by motor 24 under shaft 22. An input waveguide 60 is secured to a collimator lens 62 which in turn is secured to a prism 64, mounted upon the arm. In this construction, light is transferred from lens 62 to any particular lens 16 through the prism. The prism and lens 62 assembly is moved by the arm from one switching position to another.

Figure 8:
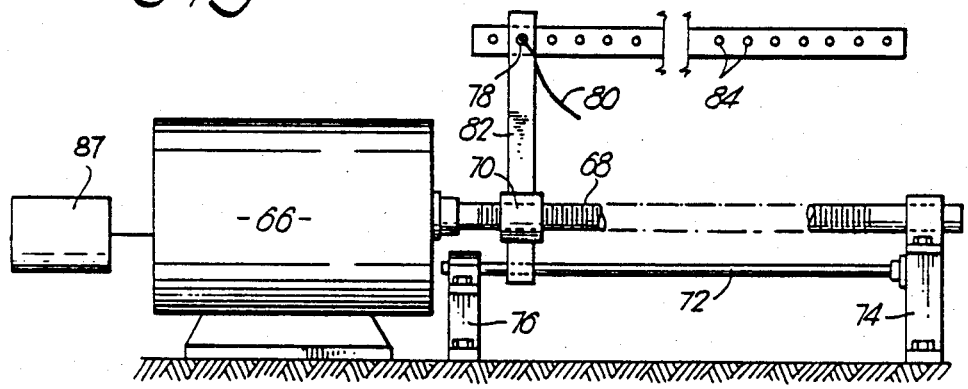
FIG. 8 is an elevational view of a fifth embodiment.

In a fifth embodiment shown in FIG. 8, an optical switch relies upon linear and not rotary motion to change switching positions. In this construction, a stepping motor 66 has a screw threaded axial extension 68 to its shaft with a nut 70 received upon the shaft. Upon rotation of the shaft in one direction or the other, the nut is moved in the corresponding direction, towards or away from the motor, and slidably along a guide spindle 72 passing through the nut and parallel to the shaft. The shaft is rotatably held in a bearing block 74 remote from the motor and the spindle 72 is held by the block 74 and a support 76.

On a light receiving side of the switch there is provided a single collimating lens 78 attached to one end of a waveguide 80, the lens being secured through a hole in a mounting plate 82 which is secured to and extends upwardly from the nut 70.

On the light transmitting side, the switch comprises a group of collimating lenses 84 attached to the ends of waveguides (not shown), one to each waveguide. As shown, the lenses 84 are disposed in side-by-side straight line relationship so that the lens 78 passes into and out of axial alignment with them as it is moved along by the shaft extension 68 and the nut.

The stepping motor is controlled by a microprocessor unit 87 which upon being given an appropriate signal corresponding to a switching position, actuates the motor to rotate it through the required stepping positions to bring the lens into that switching position.

As may be seen, the fifth embodiment provides a switch which may have a large number of lenses on its light input or output side (in this case, the output side) and has the advantages stressed for the other embodiments.

In any of the above embodiments, the roles of input and output side may be reversed. In this case, light may be passing concurrently through some or all of the waveguides to lenses of the group and the single lens is moved to the appropriate switching position, by choice, to transfer to it the light from a particular lens of the group.

In a sixth embodiment, there is shown in FIG. 9 an arrangement which illustrates that more than one arm may be used simultaneously in association with a group of lenses arranged in a pitch circle.

In the sixth embodiment, a first stepping motor, first arm prism and other parts are identical to the construction of the fourth embodiment and identical references are used. The sixth embodiment also includes a second stepping motor 86 in axial alignment with motor 24 and with the output ends of the motors opposing one another. A second arm 88 is secured to rotatatable shaft 90 of the motor 86, the arm having a collimating lens 92 which becomes axially aligned with any one of the lenses 16 as the arm 88 is rotated from position to position. Waveguide 94 is secured to the lens 92.

Although FIG. 9 shows the two arms in alignment, this is for convenience only. In use, the two arms are moved independently and in predetermined manner to transmit light between the lens 62 and one of the lenses 16 and between lens 92 and another lens 16. Clearly, however, in the FIG. 9 position, lens 92 is prevented from transmittal of light with the lens 16 with which it is aligned because of the blocking presence of arm 58.

What is claimed is:

1. An optical switch provided with a light input side and a light output side, the switch comprising:
   on one of its sides, a plurality of optical waveguides having collimating lenses, one lens at one end of each of said plurality of waveguides, the lenses being located in spaced-apart predetermined positions around at least two concentric pitch circles;
   on the other of its sides, an optical waveguide having a light collimating lens at one end, the lens movable with its end of the waveguide around arcs of at least two circles whose centres are coincident with those of the pitch circles to locate the lens in any of a plurality of switch positions in each of which light is transferable between it and any one of the plurality of lenses; means for moving said movable lens and the end of its waveguide selectively from one switching position to another on each pitch circle; and
   means to move the movable lens radially from the arc of one circle to the arc of the other to enable the movable lens to be moved to switching positions on one pitch circle or the other.

2. A switch according to claim 1 wherein the means for moving said movable lens from one switching position to another comprises an electric stepping motor and a control means sensitive to the reception of input signals to rotate the stepping motor a required angular distance to move the movable lens to a desired switching position.

3. A switch according to claim 1 wherein the means for moving said movable lens from one switching position to another comprises an electric stepping motor and a control means sensitive to the reception of input signals to rotate the stepping motor a required angular distance to move the movable lens to a desired switching position, the plurality of lenses being mounted upon a faceplate secured to an end of the motor with a rotatable shaft of the motor passing through the faceplate, and the movable lens mounted upon an arm secured to and extending radially from the rotatable shaft.

4. A switch according to claim 1 wherein the means for moving said movable lens from one switching position to another comprises an electric stepping motor and a control means sensitive to the reception of input signals to rotate the stepping motor a required angular distance to locate the movable lens in a desired switching position, the plurality of lenses are mounted upon a faceplate secured to an end of the motor with a rotatable shaft of the motor passing through the faceplate, the movable lens is mounted upon an arm secured to and extending radially from the rotatable shaft, and the means to move the movable lens from the arc of one circle to the arc of the other comprises a further electric motor and a rack and pinion, the arm being radially slidable upon the shaft of the stepping motor with the rack secured to the arm and the pinion in mesh with the rack and drivable by the further electric motor.

5. An optical switch provided with a light input side and a light output side, the switch comprising:
   on one of its sides, a plurality of optical waveguides having collimating lenses, one lens at one end of each of said plurality of waveguides, the plurality of lenses being located in spaced-apart predetermined positions around at least one pitch circle and mounted upon a faceplate;
   on the other of its sides, an optical waveguide having a movable light collimating lens at one end; means for moving said movable lens and the end of its waveguide selectively from one switching position to another in each of which light is transferable between it and any one of the plurality of lenses, said moving means comprising an electric stepping motor and a control means sensitive to the reception of input signals to rotate the stepping motor a required angular distance to locate the movable lens in a desired switching position, the motor having a rotatable shaft and the movable lens mounted upon an arm secured to and extending radially from the rotatable shaft; and
   means to prevent light from passing between the movable lens and any of the plurality of lenses as the movable lens travels to a selected switching position, said light preventing means comprising a further electric motor and a rack and pinion, the arm being radially slidable upon the shaft of the stepping motor with the rack secured to the arm and the pinion in mesh with the rack and drivable by the further electric motor, to move the arm and thus the movable lens away from the arc of the circle as the stepping motor is activated and onto the arc upon assuming a selected switching position.

* * * * *